(12) United States Patent
Ravikumar et al.

(10) Patent No.: US 9,170,795 B2
(45) Date of Patent: *Oct. 27, 2015

(54) DIGITAL ITEM INGESTION PROCESS

(71) Applicant: Amazon Technologies, Inc., Reno, NV (US)

(72) Inventors: Rahul Ravikumar, Irvine, CA (US); Chirag Anil Mehta, Irvine, CA (US); Michael R. Siwapinyoyos, Cerritos, CA (US); Stephen C. Johnson, Fullerton, CA (US); Sunbir Gill, Irvine, CA (US); Mayank Arvindbhai Patel, Brea, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,425

(22) Filed: Jun. 13, 2014

(65) Prior Publication Data

US 2014/0298288 A1 Oct. 2, 2014

Related U.S. Application Data

(63) Continuation of application No. 13/542,956, filed on Jul. 6, 2012, now Pat. No. 8,756,573.

(51) Int. Cl.
*G06F 9/44* (2006.01)
*G06F 9/445* (2006.01)
*G06F 11/36* (2006.01)

(52) U.S. Cl.
CPC .. *G06F 8/60* (2013.01); *G06F 8/33* (2013.01); *G06F 11/3668* (2013.01); *G06F 11/3688* (2013.01); *G06F 11/3696* (2013.01)

(58) Field of Classification Search
CPC ................................ G06F 8/33; G06F 11/3688
USPC .................................................... 717/110, 124
See application file for complete search history.

(56) References Cited

U.S. PATENT DOCUMENTS

| 6,301,701 | B1 | 10/2001 | Walker et al. |
| 6,324,525 | B1 * | 11/2001 | Kramer et al. ................... 705/40 |
| 8,001,275 | B2 | 8/2011 | Grin et al. |
| 8,086,758 | B1 | 12/2011 | Allan et al. |
| 8,151,247 | B2 | 4/2012 | Wefers |
| 2010/0017721 | A1 | 1/2010 | Williams et al. |
| 2013/0339241 | A1 * | 12/2013 | Knight et al. ................... 705/44 |
| 2014/0006281 | A1 * | 1/2014 | Leber ............................. 705/44 |

FOREIGN PATENT DOCUMENTS

WO 2012092021 A1 7/2012

OTHER PUBLICATIONS

International Search Report dated Feb. 7, 2014 in corresponding International Application No. PCT/US13/49431 filed Jul. 5, 2013.

* cited by examiner

*Primary Examiner* — Phillip H Nguyen
(74) *Attorney, Agent, or Firm* — Thomas | Horstemeyer, LLP

(57) ABSTRACT

Disclosed are various embodiments for an ingestion process modifying digital items. A computing system receives an uploaded digital item configured to communicate with a testing server application when executed. The ingestion process reconfigures the digital item to communicate with a production server application when executed.

20 Claims, 6 Drawing Sheets

DIGITAL ITEM INGESTION PROCESS

CROSS-REFERENCE TO RELATED APPLICATIONS

This application is a continuation of and claims priority to U.S. application Ser. No. 13/542,956 titled "DIGITAL ITEM INGESTION PROCESS", filed Jul. 6, 2012, which is incorporated herein by reference in its entirety.

BACKGROUND

Many applications have functionality to complete transactions over a network. Problems arise when a developer must test correct functionality of these applications prior to making them commercially available.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments facilitating the modification of digital items through an ingestion process. Many digital items contain functionality to complete a transaction with a server application. Often, this requires the digital item to communicate with one server application during testing of the item, and another server application after the digital item is publicly distributed. As a non-limiting example, a game application may allow a user to purchase additional in-game content by completing a financial transaction from within the application. During testing, the game should contact a testing server application configured to only simulate a financial transaction. When the game is placed on a publicly available distribution system, the game should contact a server application which will consummate the financial transactions so that a user is charged for the in-game content. A digital item can be created such that it initiates these transactions with either the testing server application or the public server application based on predetermined conditions. Through an ingestion process, a digital item can be modified to meet a predetermined condition such that it contacts the production server application without the developer having to alter the digital item.

Figure 1:
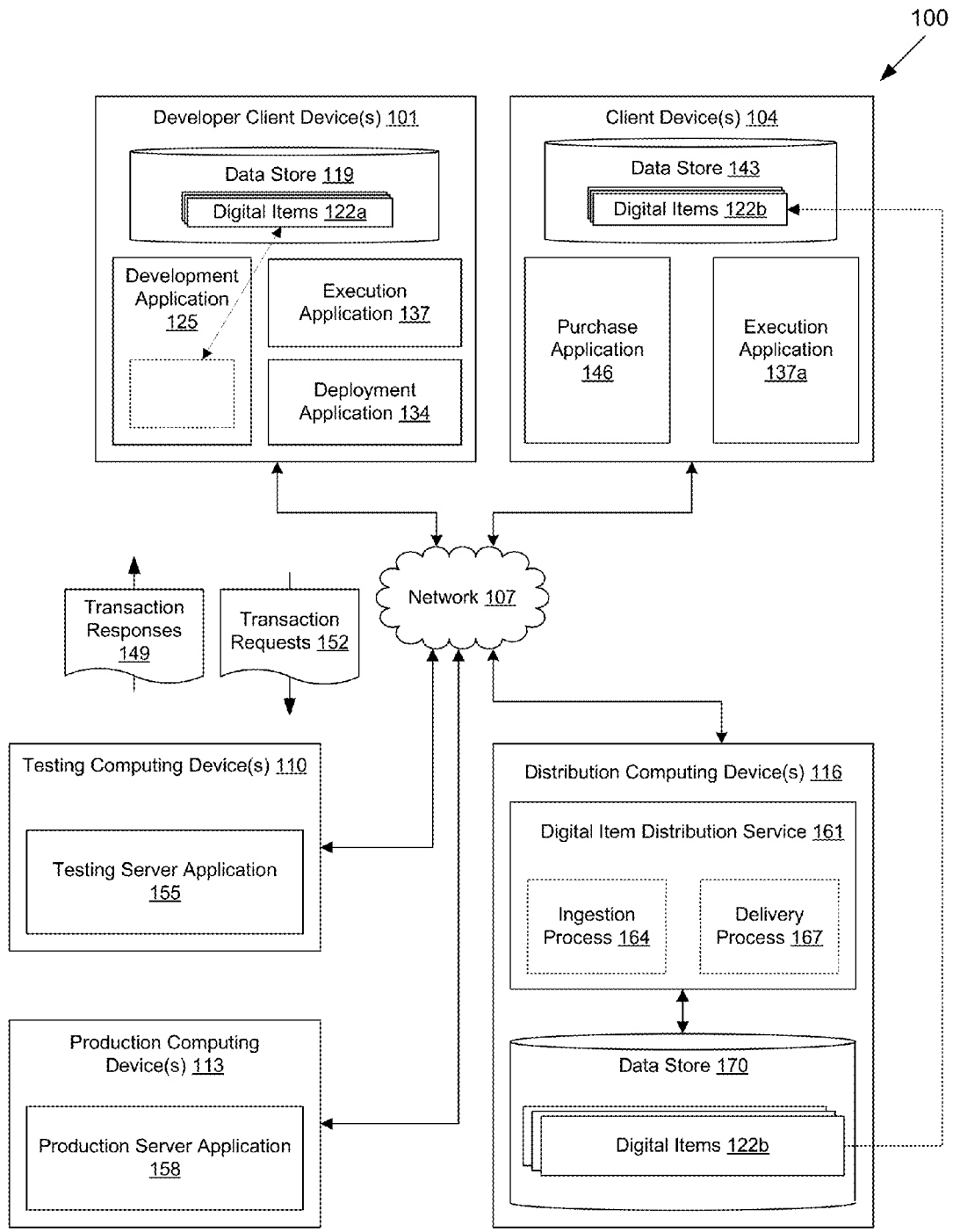
FIG. 1 is a drawing of the networked environment according to various embodiments of the present disclosure.

With reference to FIG. 1, shown is a networked environment 100 according to various embodiments. The networked environment 100 includes at least one developer client device 101, at least one client device 104, a network 107, a testing computing device 110, a production computing device 113, a distribution computing device 116, and potentially other devices. The network 107 comprises, for example, the Internet, intranets, extranets, wide area networks (WANs), local area networks (LANs), wired networks, wireless networks, or other suitable networks, etc., or any combination of two or more such networks.

The developer client device 101 and client device 104 are representative of a plurality of devices that may be coupled to the network 107. The developer client device 101 and client device 104 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

Various applications and/or other functionality may be executed in the developer client device 101 and client device 104 according to various embodiments. Also, various data is stored in data store 119 that is accessible to the developer client device 101. Various data is stored in data store 143 that is accessible to the client device 104. The data stores 119 and 143 may be representative of a plurality of data stores as can be appreciated. The data stored in the data stores 119 and 143 for example, is associated with the operation of the various applications and/or functional entities described below.

The developer client device 101 may be configured to execute various applications such as a development application 125, a deployment application 134, and/or other applications. A development application 125 may be executed in a developer client device to facilitate the creation of a digital item 122a. Such development applications 125 may comprise software development kits (SDK), integrated development environments (IDE), text editors, hexadecimal editors (hex editor), word processors, video editors, audio editors, or productivity suites. An instance of digital item 122a may be saved in data store 119. A deployment application 134 may be executed in the development client device 101 to facilitate the upload of an instance of a digital item 122 to a distribution computing device 116, and may comprise a browser, to access and render network pages served up by a process executing on the distribution computing device, a terminal which executes input commands, a dedicated executable application, or another application as may be appreciated.

A digital item 122a may comprise an executable item, a media item, or another type of digital item. Executable items may refer to applications, binaries, or any other file containing executable logic as may be appreciated. Media items may comprise music files, video files, documents, eBooks, or any other data file which requires an execution application 137 to render such as to display or play audio, visual, or text content to a user. An execution application 137 may refer to applications containing executable logic to decode music, text, or video data, including video players, audio players, eBook readers, or any other application which facilitates a user's interaction with a media version of digital item 122a as may be appreciated.

The client device 104 may be configured to execute various applications such as a purchase application 146, and/or other applications. A purchase application 146 may be executed in a client device to facilitate the download of an instance of a digital item from a distribution computing device 116, and may comprise a browser, to access and render network pages served up by a process executing on the distribution computing device 116, a dedicated executable application, or other application as may be appreciated. Purchase application 146 will also facilitate any financial transactions prerequisite to downloading an ingested instance of a digital item 122a (referred to here as digital item 122b) which may then be saved in data store 143. The client device 104 may also execute an instance of execution application 137 (referred to as execution application 137a) to render media item versions of digital item 122b.

The testing computing device 110 and production computing device 113 may comprise, for example, a server computer or any other system providing computing capability. Alternatively, a plurality of computing devices 110 and 113 may be employed that are arranged, for example, in one or more server banks or computer banks or other arrangements. For example, a plurality of computing devices 110 and 113 together may comprise a cloud computing resource, a grid computing resource, and/or any other distributed computing arrangement. Such computing devices 110 and 113 may be located in a single installation or may be distributed among many different geographical locations. For purposes of convenience, each of the computing devices 110 or 113 referred to herein in the singular. Even though the computing devices 110 or 113 are referred to in the singular, it is understood that a plurality of computing devices 110 or 113 may be employed in the various arrangements as described above.

The components executed on the testing computing device 110 for example, include a testing server application 155, and other applications, services, processes, systems, engines, or functionality not discussed in detail herein. The testing server application 155 is executed to simulate consummation of transactions in relation to the testing of digital item 122a.

The components executed on the production computing device 149 for example, include a production server application 158, and other applications, services, processes, systems, engines, or functionality not discussed in detail herein. The production server application 158 is executed to consummate transactions relating to an execution on a client device 104 of an instance of a digital item 122b as will be described.

The distribution computing device 116 may comprise, for example, a server computer or any other system providing computing capability. Alternatively, a plurality of distribution computing devices 116 may be employed that are arranged, for example, in one or more server banks or computer banks or other arrangements. For example, a plurality of distribution computing devices 116 together may comprise a cloud computing resource, a grid computing resource, and/or any other distributed computing arrangement. Such distribution computing devices 116 may be located in a single installation or may be distributed among many different geographical locations. For purposes of convenience, the distribution computing device 116 is referred to herein in the singular. Even though the computing device is referred to in the singular, it is understood that a plurality of distribution computing devices 116 may be employed in the various arrangements as described above.

The components executed on a distribution computing device 116 for example, include a digital item distribution service 161, and other applications, services, processes, systems, engines, or functionality not discussed in detail herein. The digital item distribution service 161 is executed to facilitate, through the use of an ingestion process 164, the upload of digital items 122a from a deployment application 134 over a network 107. The ingested instance of digital item 122a (referred to here as digital item 122b) may be saved in the data store 170. The digital item distribution service 161 also uses a delivery process 167 to facilitate the download of the ingested instance of digital item 122b over a network 107 to a client device 104 executing a purchase application 146. To these ends, the digital item distribution service 161 may communicate with developer client devices 101 and client devices 104 over various protocols such as, for example, hypertext transfer protocol (HTTP), file transfer protocol (FTP), HTTP Secure (HTTPS), simple object access protocol (SOAP), representational state transfer (REST), user datagram protocol (UDP), transmission control protocol (TCP), and/or other protocols for communicating data over the network 107. In various embodiments, the digital item distribution service 161 may support the use of anycast services and/or peer-to-peer (P2P) protocols such as, for example, BitTorrent, for data communications. Additionally, the digital item distribution service 161 may monitor the progress of scheduled uploads or downloads to ensure completion of the transfers.

The data store 170 may be representative of a plurality of data stores as can be appreciated. The data stored in the data store 170 includes, for example, ingested instances of digital items 122b, and potentially other data.

Next, a general description of the operation of the various components of the networked environment 100 is provided. To begin, a digital item 122a is created on a developer client device 101 using one or more development applications 125. The digital item 122a contains logic which initiates transactions with either a testing server application 155 before ingestion, or a production server application 158 after ingestion. For example, in some embodiments, this may comprise a game which contains logic for a player to unlock additional functionality in exchange for money. In other embodiments, this may comprise a video media item which contains logic to permit access to additional video content. In addition, the digital item 122a may interact with the testing server application 155 and production server application 158 in other contexts. This logic sends a transaction request 152 to either the testing server application 155 or production server application 158. A transaction request 152 may comprise data indicating which functionality is to be unlocked and other data sufficient for the testing server application to simulate a consummation of a transaction. Such transaction requests 152 may include credit card information or other user identification information.

The testing server application, in response to a transaction request 152 simulates the completion or failure of a transaction, and sends a plurality of transaction responses 149 to the digital item 122a indicating the simulated outcome. In some embodiments, the testing computing device 110 comprises one or more computing devices with which the developer client device 101 communicates over a network 107. In other embodiments, the testing computing device 110 may be the same system as the developer client device 101, and the testing server application 155 is one of many applications executing on the developer client device 101.

In embodiments in which the testing server application 155 is executed on the developer client device 101, whether the testing server application 155 simulates a successful or unsuccessful transaction may depend on input into a user interface. For example, in one embodiment the digital item 122a may request a transaction be completed by communicating a transaction request 152 to the testing server application 155. The testing server application 155 displays a user interface, soliciting input on whether to simulate a successful transaction or an unsuccessful transaction. Such input may also indicate a type of transaction to be performed. Based on the input to the user interface, the testing server application 155 generates a transaction response 149 which is then communicated to the digital item 122a.

A production server application 158, in response to a transaction request 152, attempts to consummate the requested transaction. Based on the success of the attempt to consummate the transaction, the production server application communicates a transaction response 149 to the ingested instance of digital item 122b which sent the original transaction request 152. The transaction responses 149 indicate whether the transaction was successful, such as when a credit card transaction is accepted, or unsuccessful, such as when a credit card is declined. In other examples, the transaction request 152 may initiate a transaction in which funds are withdrawn from a prepaid account. In a successful transaction, the transaction response 149 indicates that the account contained sufficient funds and the necessary amount has been withdrawn from the account. An unsuccessful transaction response 149 indicates the account lacked sufficient funds. In some embodiments the production server application is executed on a production computing device 113. In other embodiments it is executed as one of several applications executed on a distribution computing device 116.

The digital item 122a contains logic to ensure transaction requests 152 are communicated to the testing server application 155 before ingestion and the production server application 158 after ingestion. Such logic may be stored in an application program interface, a library, or another component. In some embodiments, determining whether to send transaction requests 152 to a testing server application 155 or a production server application 158 is performed by logic which checks for the presence of digital rights management. In other embodiments, the digital item 122a contains logic which executes a method defined in a library of the digital item 122a. In this case, the library of digital item 122a defines methods which communicate transaction requests 152 to the testing server application 155. In another embodiment, the digital item 122a sends transaction requests 152 to a network address defined in a file component of the digital item. Prior to ingestion, this network address points to the testing server application 155.

A deployment application 134 executed on the developer client device 101 facilitates the upload of the digital item 122a over a network 107 to the distribution computing device 116. The distribution computing device 116 executes a digital item distribution service 161 comprising an ingestion process 164 that facilitates the upload of the digital item 122a. The ingestion process 164 also modifies the uploaded instance of digital item 122a to an ingested version of the digital item 122b. The ingested digital item 122b has been modified such that transaction requests 152 are communicated to a production server application 158.

In the case where digital item 122a sends transaction requests 152 to the testing server application 155 in the absence of digital rights management, the ingestion process 164 applies digital rights management to the digital item 122a. This ingested instance of digital item 122b sends transaction requests 152 to the production server application 158 based on logic which detects the presence of the digital rights management. In another embodiment, where the transaction requests of the digital item 122a are sent using logic defined in a library component, the ingestion process 164 replaces the library component of digital item 122a. In this ingested instance of digital item 122b, the library component defines logic in which transaction requests 152 are sent to the production server application 158.

In another embodiment, the digital item 122a sends transaction requests 152a to a testing server application 155 pointed to by a network address stored in a file component. The ingestion process 164 automatically modifies the file component such that the network address of the file component now points to a production server application 158. Other modifications to the instance of digital item 122a may be used by the ingestion process 164 as appreciated such that the ingested instance 122b communicates its transaction requests 152 to the production server application 158. Ingested instances of the digital item 122b are saved to data store 170.

A client device 104 may access the digital item distribution service 161 through a purchase application 146. In one embodiment, the purchase application 146 is a browser rendering network pages generated by the digital item distribution service 161. In another embodiment, the purchase application 146 is a dedicated executable application such as, for example, an app store, or other executable applications. The digital item distribution service 161 generates a list of ingested digital items 122b available for purchase by the purchase application 146. The list of digital items 122b may be based on a variety of criteria, comprising search terms, popularity of digital items 122b, user preferences, and previous purchase history. The purchase application 146 renders a user interface expressing the list of digital items 122b available for purchase from the digital item distribution service 161. Based on input from the user interface indicating a digital item 122b to purchase, a delivery process 167 facilitates a download of a purchased instance of the digital item 122b over the network 107 to a client device 104.

According to one embodiment, an ingested instance of digital item 122b purchased from the digital item distribution service 161 will have been modified by the ingestion process 164. When executed on a client device 104, the digital item 122b will communicate transaction requests 152 to a production server application 158 as described above.

Figure 2:
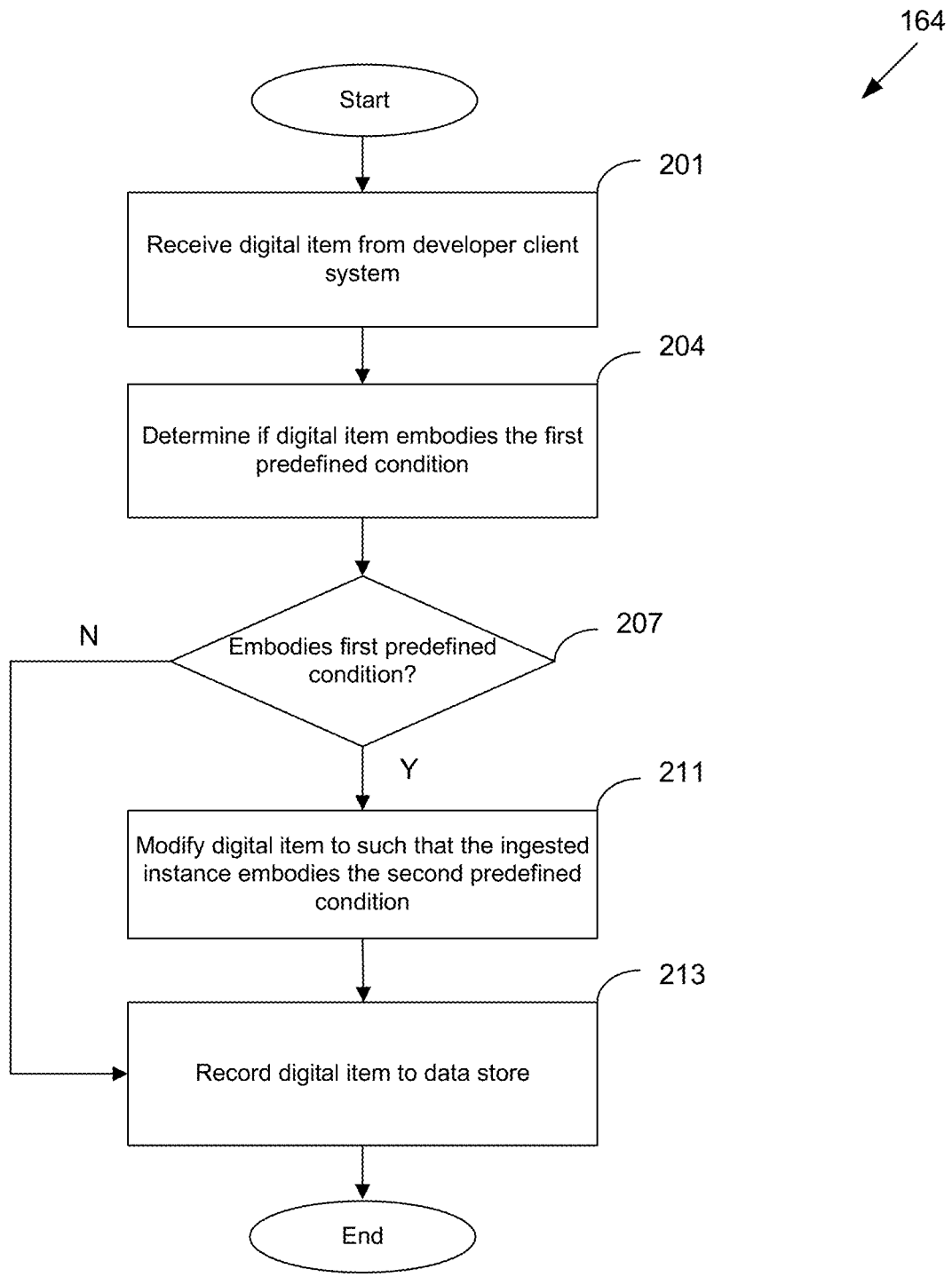
FIG. 2 is a flowchart illustrating one example of functionality implemented as portions of the ingestion process executed in a computing device in the distribution computing device of FIG. 1 according to various embodiments of the present disclosure.

Referring next to FIG. 2, shown is a flowchart that provides one example of the operation of a portion of the ingestion process 164 (FIG. 1) according to various embodiments. It is understood that the flowchart of FIG. 2 provides merely an example of the many different types of functional arrangements that may be employed to implement the operation of the portion of the ingestion process 164 as described herein. As an alternative, the flowchart of FIG. 2 may be viewed as depicting an example of steps of a method implemented in the distribution computing device 116 (FIG. 1) according to one or more embodiments.

The operation performed in FIG. 2 is triggered by the upload of a digital item 122a (FIG. 1) to the digital item distribution service 161 (FIG. 1) by a developer client device 101 (FIG. 1). As described above, this version of the digital item 122a is configured such that it sends transaction requests 152 (FIG. 1) to a testing server application 155 (FIG. 1). The ingestion process 164 modifies the digital item 122a. This ingested instance of the digital item 122b (FIG. 1) will communicate its transaction requests to a production server application 158. The ingested instances of the digital item 122b are then saved to a data store 170 (FIG. 1). Client devices 104 (FIG. 1) which connect to the digital item distribution service 161 can then download ingested instances of the digital item 122b stored in the data store 170.

Beginning with box 201, a digital item 122a is uploaded to a digital item distribution service 161 through a network 107 (FIG. 1). In some embodiments, this is accomplished through a deployment application 125 (FIG. 1) executed on a developer client device 101 facilitating the upload of the digital item 122. In box 204, the ingestion process 164 determines if the uploaded digital item 122a embodies a first predefined condition. A digital item digital item 122a embodies the first predefined condition when it is configured in such a way that transaction requests 152 send by the digital item 122a are sent to a testing server application 155. In one embodiment, the first predefined condition is met when there is no digital rights management present on the digital item 122a.

In another embodiment, determining if the digital item 122a embodies the first predefined condition comprises examining a library of the digital item 122a. For example, this determination may comprise directly examining the methods or logic defined within the library of the digital item 122a to see if the defined methods or logic, when executed, send transaction requests 152 to a testing server application 155. This determination may also comprise examining a unique identifier associated with the library component, such as a checksum, another hashed sum, or some other unique identifier. The unique identifier is then compared to known values indicating whether or not the digital item 122a embodies the first predefined condition.

In another embodiment, determining of the digital item 122a is configured to communicate with a testing server application 155 may comprise examining the network address stored in a file accessible to the digital item 122a. In one embodiment, this may comprise comparing the network address stored in the file to a list of addresses known to point to testing server applications. In other embodiments, this may comprise looking for certain substrings or keywords within the network address.

In box 207, the ingestion process 164 proceeds based on whether the digital item 122a embodies the first predefined condition as determined in box 204. In box 211, if the digital item 122a embodied the first predefined condition, the ingestion process 164 then modifies the digital item 122a such that the ingested instance of the digital item 122b embodies the second predefined condition. A digital item digital item 122b embodies the second predefined condition when it is configured in such a way that transaction requests 152 send by the digital item 122b are sent to a production server application 158.

In some embodiments, the ingested instance of the digital item 122b will send its transaction requests 152 to a destination determined by the presence of digital rights management. In these instances, the ingestion process 164 applies digital rights management to the uploaded digital item 122a to produce an ingested instance of the digital item 122b.

In another embodiment, the ingested instance of the digital item 122b will send its transaction requests 152 by executing logic or methods defined within a library. In this embodiment, the ingestion process 164 is configured to replace an existing library of the uploaded digital item 122a with a different library. The library of the ingested instance of the digital item 122b defines logic or methods that execute a function sending transaction requests 152 to a production server application 158.

In another embodiment, the ingested instance of the digital item 122b will send its transaction requests 152 to a destination pointed to by a network address stored in a file. In this embodiment, the ingestion process 164 is configured to modify the network address stored within the file to point to a production server application 158.

If the uploaded instance of the digital item 122a did not embody the first predefined condition (see box 207), ingestion is completed without modification, and the operation proceeds to box 213. Finally, in box 213, the ingested instance of the digital item 122b is saved to data store 170, where it is accessible to the digital item distribution service 161.

Figure 3A:
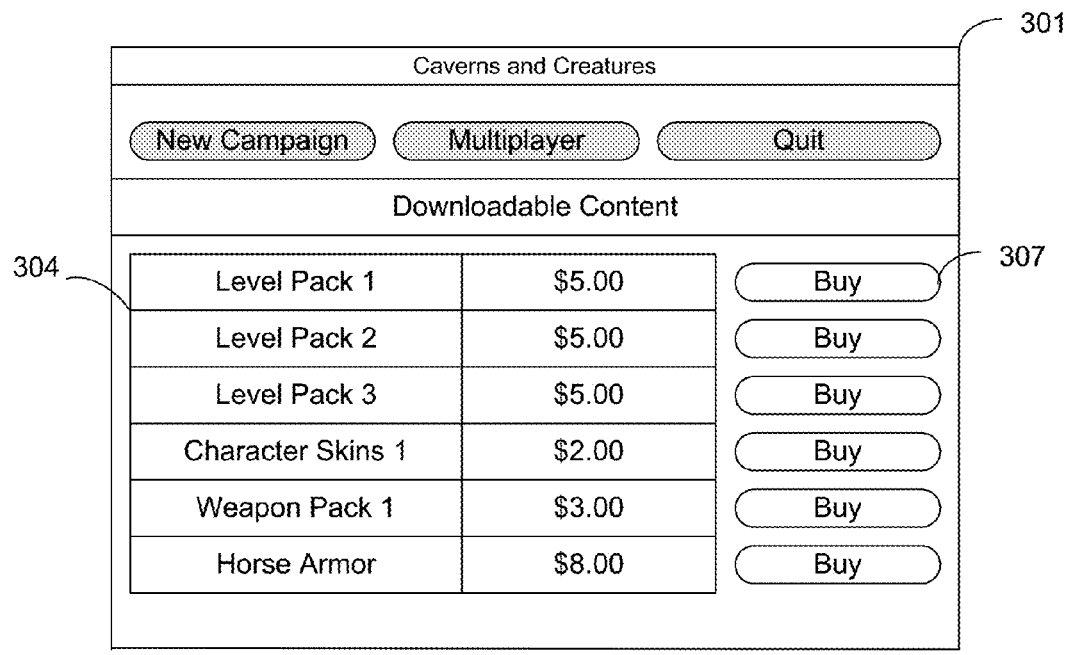
FIGS. 3A and 3B are drawings of examples of user interfaces rendered by a developer client device in the networked environment of FIG. 1 executing a testing server application according to various embodiments of the present disclosure.
Figure 3B:
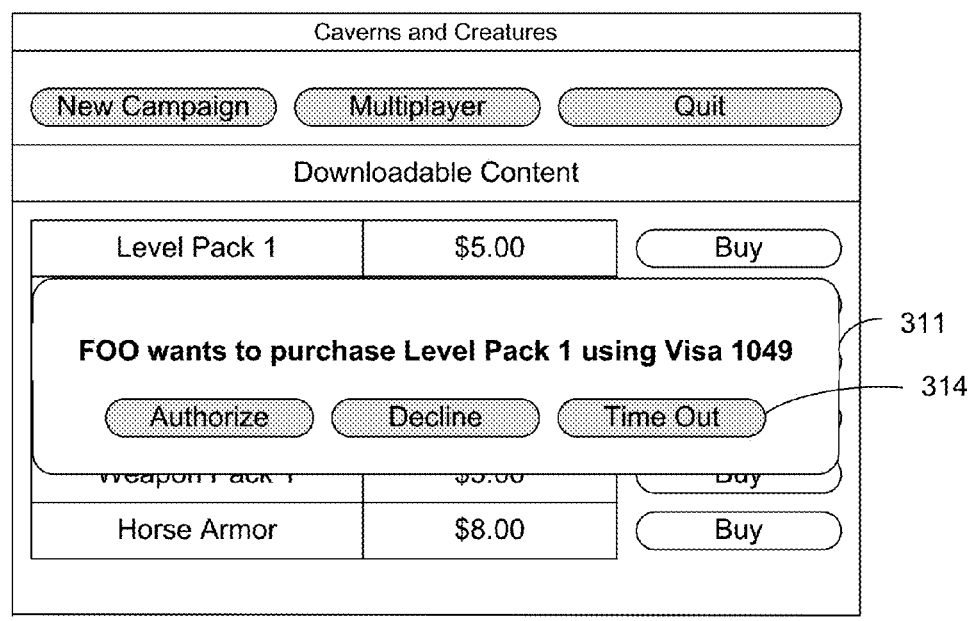

Moving on to FIG. 3A and FIG. 3B, shown is one example of a user interface interacting with the testing server application 155 (FIG. 1) according to various embodiments. In this embodiment, the testing server application 155 is executed on the developer client device 101 (FIG. 1). Item 301 depicts a user interface generated by a digital item 122a (FIG. 1) executed on the developer client device 101. In this example, the digital item 122a comprises a game for which various enhancements can be purchased from within the game. An enhancement list 304 lists the enhancements that are available for purchase and their corresponding prices. A button 307 accompanies each entry into the enhancement list 304 that initiates a financial transaction to purchase corresponding enhancement.

When a button 307 is clicked by the user the digital item 122a sends transaction requests 152 (FIG. 1) to the testing server application 155. Moving on to FIG. 3B, testing server application 155 then encodes for rendering a user interface 311 soliciting input from the user. The user interface 311 is then send to the client device 104 for display. User interface 311 contains response options 314. When a user selects a response option 314, the testing server application 155 simulates a consummation of the transaction based on the input to the user interface 311. The testing server application 155 then sends a corresponding transaction response 149 to the digital item 122a.

Figure 4:
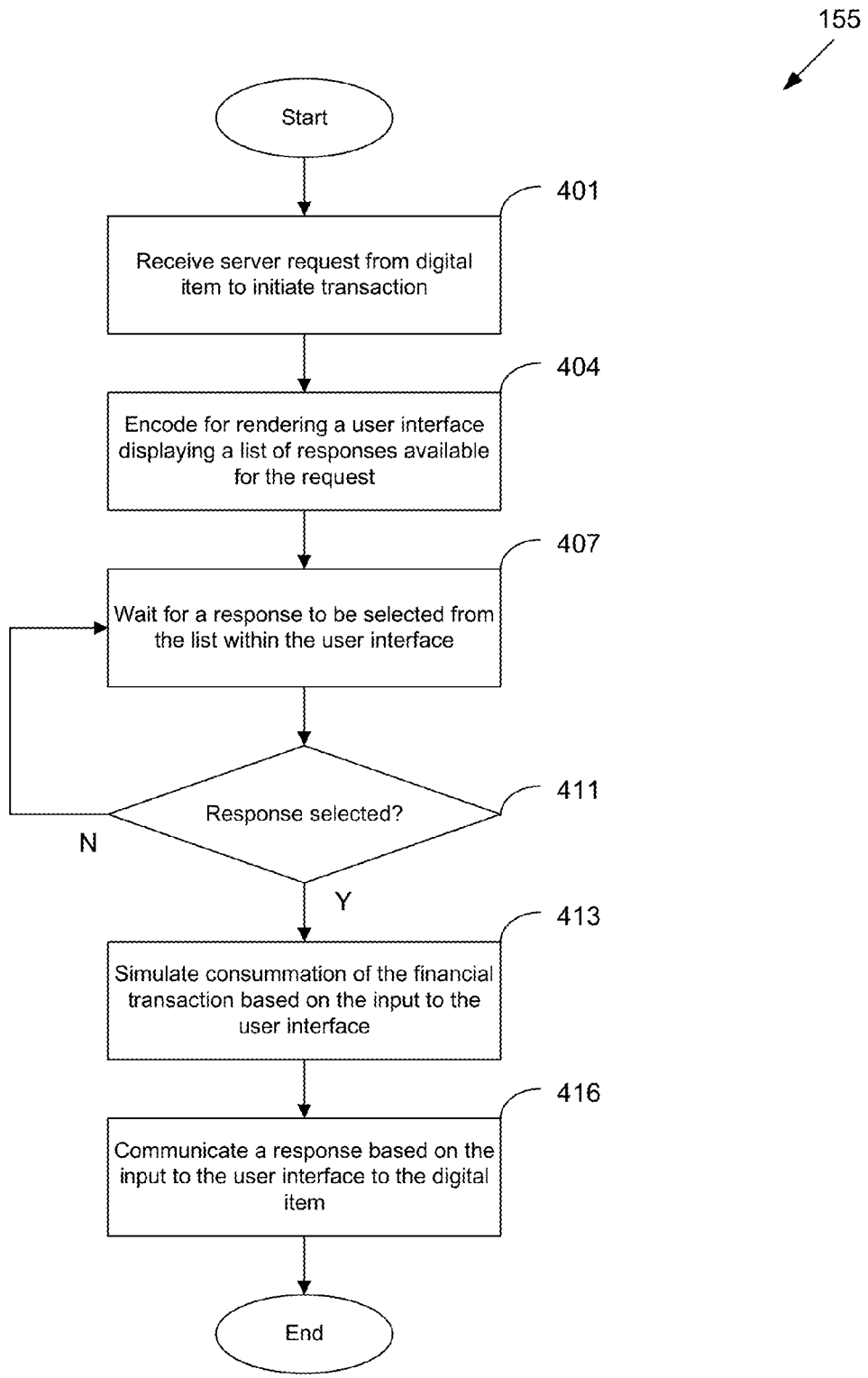
FIG. 4 is a flowchart illustrating one example of functionality implemented as portions of a testing server application executed in a computing device in the testing computing device of FIG. 1 according to various embodiments of the present disclosure.

Referring next to FIG. 4, shown is a flowchart that provides one example of the operation of a portion of the testing server application 155 (FIG. 1) according to various embodiments. It is understood that the flowchart of FIG. 4 provides merely an example of the many different types of functional arrangements that may be employed to implement the operation of the portion of testing server application 155 as described herein. As an alternative, the flowchart of FIG. 4 may be viewed as depicting an example of steps of a method implemented in the testing computing device 110 (FIG. 1) according to one or more embodiments.

The operation of FIG. 4 is triggered in some embodiments in which the testing server application 155 is executed on the developer client device 101 (FIG. 1). A digital item 122a (FIG. 1) is executed on the developer client device 101. In the case of a media item, this execution is facilitated by an execution application 137 (FIG. 1). In the case of an executable item, the necessary executable logic is contained within the item and an execution application 137 is not needed. When the digital item 122a initiates a transaction it sends a transaction request 152 (FIG. 1) to the testing server application 155. The testing server application 155 then generates a user interface allowing the user to control the transaction response 149 (FIG. 1) send to the digital item 122a.

Beginning with box 401, a transaction request 152 is communicated from a digital item 122a to the testing server application 155. This transaction request 152 is used to initiate a transaction with the testing server application 155. As stated above, the transaction may comprise a financial transaction, a download of media content, or some other transaction. In box 404, upon receiving the transaction request 152, the testing server application 155 renders a user interface indicating a list of possible responses to the request.

The list of possible choices varies based on the transaction which the digital item 122a attempts to initiate. For example, in response to a transaction request 152 beginning a financial transaction paid for using a credit card, the testing server application 155 may render a user interface with a list of choices indicating an authorized credit card, a declined credit card, a network timeout, or other choices. In another example, in response to a transaction request 152 beginning a financial transaction paid for using a pre-paid account, the testing server application 155 may render a user interface with a list of choices indicating a successful use of funds, insufficient funds, or other choices. In a transaction for downloading media content, the user interface may list choices indicating an allowed download, a denied download based on user restrictions, temporary unavailability, or other choices.

The testing server application 155 does not send a transaction response 149 to the digital item 122a until the user interface receives input. Accordingly, in boxes 407 and 411, the testing server application 155 waits until a response is selected within the user interface. In box 413, after an input is selected, the testing server application 155 simulates consummation of the transaction based on the input to the user interface. For example, in financial transactions which are paid for using a simulated account, the account is debited an appropriate amount. In other embodiments, the testing server application 155 may communicate a confirmation message to the user via email, text message, or other communications medium. Finally, box 416 shows the testing server application sending a transaction response 149 based on the input to the user interface.

Figure 5:
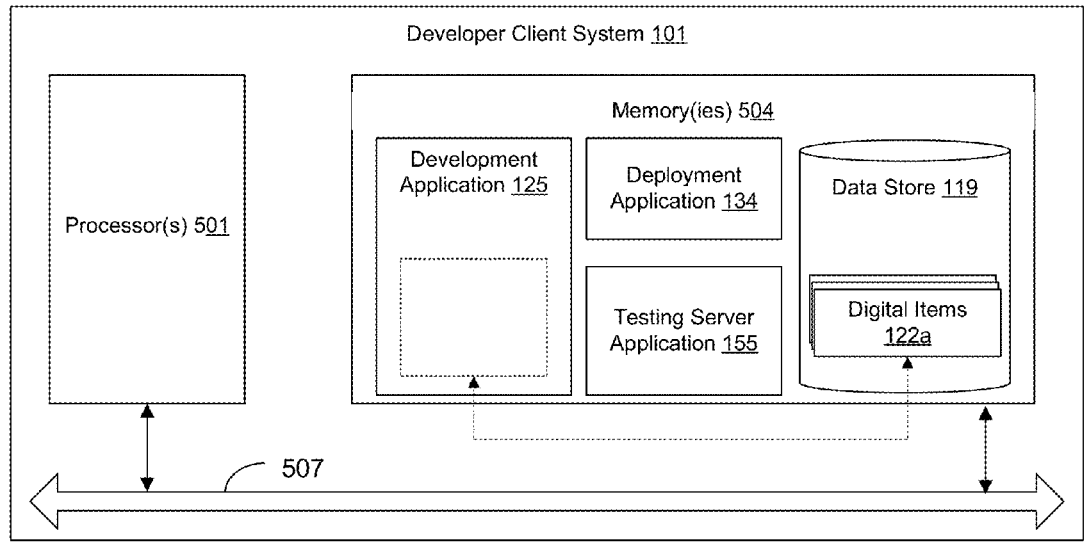
FIG. 5 is a schematic block diagram that provides one example illustration of a developer client device of FIG. 1 according to various embodiments of the present disclosure.

With reference to FIG. 5, shown is a schematic block diagram of the developer client device 101 (FIG. 1) according to an embodiment of the present disclosure. The developer client device 101 includes at least one processor circuit, for example, having a processor 601 and a memory 604, both of which are coupled to a local interface 607. To this end, the developer client device 101 may comprise, for example, at least one server computer or like device. The local interface 507 may comprise, for example, a data bus with an accompanying address/control bus or other bus structure as can be appreciated.

Stored in the memory 504 are both data and several components that are executable by the processor 501. In particular, stored in the memory 504 and executable by the processor 501 are a development application 125 (FIG. 1), a deployment application 134 (FIG. 1), a testing server application 155 (FIG. 1), and potentially other applications. Also stored in the memory 504 may be a data store 119 (FIG. 1) storing instances of a digital item 122a (FIG. 1), and other data. In addition, an operating system may be stored in the memory 504 and executable by the processor 501.

Figure 6:
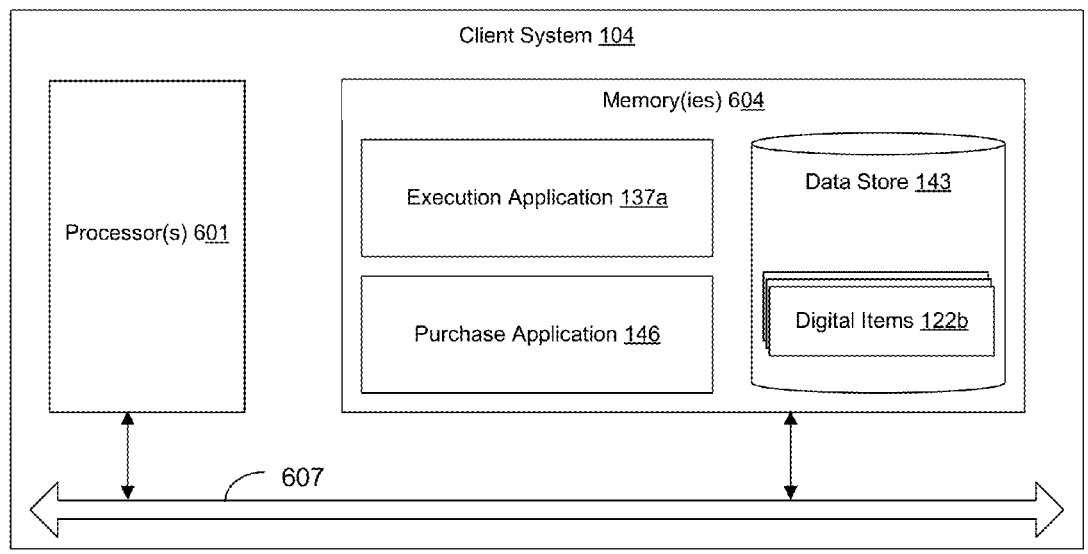
FIG. 6 is a schematic block diagram that provides one example illustration of a client device of FIG. 1 according to various embodiments of the present disclosure.

With reference to FIG. 6, shown is a schematic block diagram of the client device 104 (FIG. 1) according to an embodiment of the present disclosure. The client device 104 includes at least one processor circuit, for example, having a processor 601 and a memory 604, both of which are coupled to a local interface 607. To this end, the client device 104 may comprise, for example, at least one server computer or like device. The local interface 607 may comprise, for example, a data bus with an accompanying address/control bus or other bus structure as can be appreciated.

Stored in the memory 604 are both data and several components that are executable by the processor 601. In particular, stored in the memory 604 and executable by the processor 601 are a purchase application 146 (FIG. 1), an instance of an execution application 137 (FIG. 1), and potentially other applications. Also stored in the memory 604 may be a data store 143 (FIG. 1) storing instances of a digital item 122b (FIG. 1), and other data. In addition, an operating system may be stored in the memory 504 and executable by the processor 501.

Figure 7:
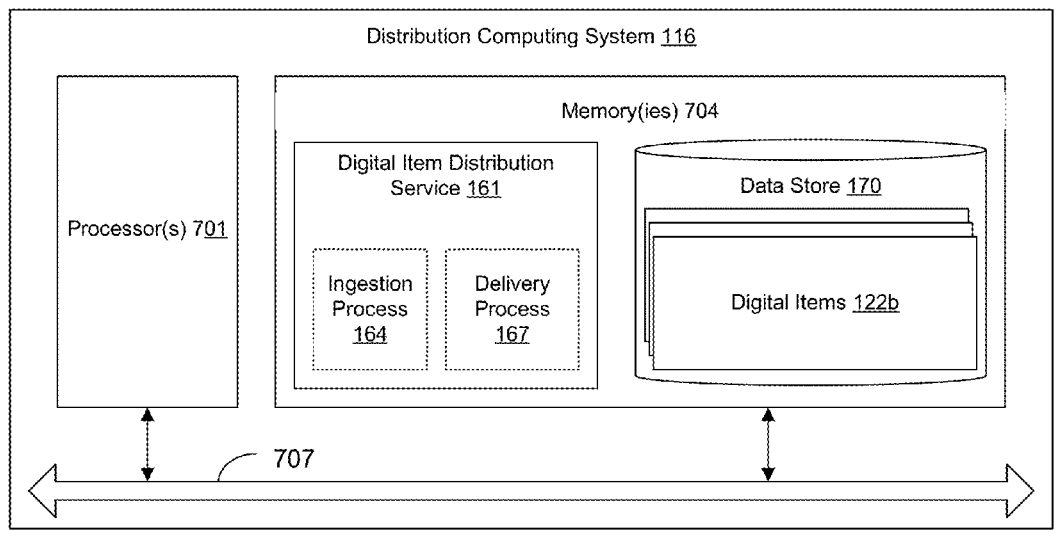
FIG. 7 is a schematic block diagram that provides one example illustration of a computing device employed in the distribution computing device of FIG. 1 according to various embodiments of the present disclosure.

With reference to FIG. 7, shown is a schematic block diagram of the distribution computing device 116 (FIG. 1) according to an embodiment of the present disclosure. The distribution computing device 116 includes at least one processor circuit, for example, having a processor 701 and a memory 704, both of which are coupled to a local interface 707. To this end, the distribution computing device 116 may comprise, for example, at least one server computer or like device. The local interface 707 may comprise, for example, a data bus with an accompanying address/control bus or other bus structure as can be appreciated Stored in the memory 704 are both data and several components that are executable by the processor 701. In particular, stored in the memory 704 and executable by the processor 701 is a digital item distribution service 161 (FIG. 1) comprising an ingestion process 164 (FIG. 1) and a delivery process 167 (FIG. 1), and potentially other applications. Also stored in the memory 704 may be a data store 170 storing ingested instances of digital items 122b (FIG. 1), and other data. In addition, an operating system may be stored in the memory 704 and executable by the processor 701.

It is understood that there may be other applications that are stored in the memories 504, 604, and 704 and are executable by the processors 501, 601, and 701 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 504, 604, and 704 and are executable by the processors 501, 601, and 701. In this respect, the term "executable" means a program file that is in a form that can ultimately be run by the processors 501, 601, and 701. Examples of executable programs may be, for example, a compiled program that can be translated into machine code in a format that can be loaded into a random access portion of the memories 504, 604, and 704 and run by the processors 501, 601, and 701, source code that may be expressed in proper format such as object code that is capable of being loaded into a random access portion of the memories 504, 604, and 704 and executed by the processors 501, 601, and 701, or source code that may be interpreted by another executable program to generate instructions in a random access portion of the memories 504, 604, and 704 to be executed by the processors 501, 601, and 701, etc. An executable program may be stored in any portion or component of the memories 504, 604, and 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 504, 604, and 704 are defined herein as including both volatile and nonvolatile memory and data storage components. Volatile components are those that do not retain data values upon loss of power. Nonvolatile components are those that retain data upon a loss of power. Thus, the memories 504, 604, and 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 501, 601, and 701 may represent multiple processors 501, 601, and 701 and the memories 504, 604, and 704 may represent multiple memories 504, 604, and 704 that operate in parallel processing circuits, respectively. In such a case, the local interfaces 507, 607, and 707 may be an appropriate network 107 (FIG. 1) that facilitates communication between any two of the multiple processors 501, 601, and 701, between any processors 501, 601, and 701 and any of the memories 504, 604, and 704, or between any two of the memories 504, 604, and 704, etc. The local interfaces 507, 607, and 707 may comprise additional systems designed to coordinate this communication, including, for example, performing load balancing. The processors 501, 601, and 701 may be of electrical or of some other available construction.

Although the ingestion process 164 (FIG. 1), testing server application 155 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the appstore test client. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processors 501, 601, and 701 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the testing server application 155 (FIG. 1), the digital item distribution service 161 (FIG. 1), and the ingestion process 164 (FIG. 1), that comprises software or code can be embodied in any non-transitory computer-readable medium for use by or in connection with an instruction execution system such as, for example, a processors 501, 601, and 701 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains, in response to a submission for distribution by an application distribution service, an instance of an application configured to communicate at least one transaction request to a first server application;
    code that determines whether to modify the instance of the application based at least in part on at least one of: whether the instance of the application includes digital rights management, a library component of the instance of the application, or a network address encoded in a file component of the application;
    code that modifies the instance of the application to communicate the at least one transaction request to a second server application distinct from the first server application by at least one of: applying the digital rights management to the instance of the application, replacing the library component of the application, or modifying the network address; and
    code that adds, after the modifying, the instance of the application to a catalog of applications available for distribution via the application distribution service.

2. The computer-readable medium of claim 1, wherein the instance of the application is configured to communicate the at least one transaction request to the first server application by communicating the at least one transaction request to a network address of a client device executing the instance of the application.

3. A system, comprising:
  at least one computing device comprises at least one processor and a memory; and
  at least one application executed by the at least one processor in the at least one computing device, the at least one application comprising:
    logic that obtains, from a client device, an instance of a digital item configured to communicate at least one transaction request to a first server application; and
    logic that modifies the instance of the digital item to communicate the at least one transaction request to a second server application distinct from the first server application.

4. The system of claim 3, wherein the first server application is configured to simulate at least one transaction associated with the at least one transaction request, and the second server application is configured to consummate the at least one transaction associated with the at least one transaction request.

5. The system of claim 3, wherein the logic that modifies is executed responsive to the instance of the digital item being configured to communicate the at least one transaction request to the first server application.

6. The system of claim 5, wherein the at least one application further comprises logic that determines whether the instance of the digital item is configured to communicate the at least one transaction request to the first server application based at least in part on a library component of the instance of the digital item.

7. The system of claim 5, wherein the at least one application further comprises logic that determines whether the instance of the digital item is configured to communicate the at least one transaction request to the first server application based at least in part on a network address encoded in a file accessible to the instance of the digital item.

8. The system of claim 5, wherein the at least one application further comprises logic that determines whether the instance of the digital item is configured to communicate the at least one transaction request to the first server application by determining whether the instance of the digital item includes digital rights management.

9. The system of claim 3, wherein the instance of the digital item is configured to communicate the at least one transaction request to the first server application or the second server application based at least in part on whether digital rights management is applied to the instance of the digital item, and the logic that modifies the instance of the digital item further comprises logic that applies the digital rights management to the instance of the digital item.

10. The system of claim 3, wherein the instance of the digital item is configured to communicate the at least one transaction request to the first server application or the second server application based at least in part on a first library component of the instance of the digital item, and the logic that modifies the instance of the digital item further comprises logic that replaces the first library component of the instance of the digital item with a second library component.

11. The system of claim 3, wherein the instance of the digital item is configured to communicate the at least one transaction request to the first server application or the second server application based at least in part on a network address encoded in a file accessible to the instance of the digital item, and the logic that modifies the instance of the digital item further comprises at least one of: logic that modifies the file accessible to the instance of the digital item or logic that replaces the file accessible to the instance of the digital item.

12. The system of claim 3, wherein the at least one application further comprises logic that, after modifying the instance of the digital item, makes the instance of the digital item available for distribution via a digital item distribution service.

13. A method, comprising:
  obtaining, by at least one computing device, an instance of a digital item configured to communicate at least one transaction request to a first server application;
  modifying, by the at least one computing device, the instance of the digital item to communicate the at least one transaction request to a second server application distinct from the first server application; and
  adding, by the at least one computing device, after the modifying, the instance of the digital item to a catalog of digital items available for distribution via a digital item distribution service.

14. The method of claim 13, wherein the obtaining is performed in response to a submission for distribution of the instance of the digital item to the digital item distribution service.

15. The method of claim 13, wherein the first server application is executed in a client device executing the instance of the digital item.

16. The method of claim 15, wherein the first server application configured to generate at least one transaction response according to an input to a user interface rendered by the client device.

17. The method of claim 16, wherein the at least one transaction response indicates at least one of a completion of the transaction or a failure of the transaction.

18. The method of claim 13, further comprising determining, by the at least one computing device, whether to modify the instance of the digital item based at least in part on at least one of: a unique identifier associated with a library of the digital item or an examining of a defined portion of the library of the digital item.

19. The method of claim 13, wherein the first server application is configured to simulate at least one financial transaction associated with the at least one request, and the second server application is configured to consummate the at least one financial transaction associated with the at least one request.

20. The method of claim 13, wherein modifying the instance of the digital item comprises at least one of: applying digital rights management to the instance of the digital item, replacing a library component of the digital item, or modifying a network address encoded in a file accessible to the instance of the digital item.

* * * * *